United States Patent
Tang et al.

(10) Patent No.: US 6,798,606 B2
(45) Date of Patent: Sep. 28, 2004

(54) POSITION ERROR SIGNAL LINEARIZATION CALIBRATION

(75) Inventors: Yifan Tang, Pleasanton, CA (US); Craig N. Fukushima, Monte Sereno, CA (US); Isao Yoneda, Yokohama (JP); Hiroshi Uchida, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/054,587

(22) Filed: Jan. 22, 2002

(65) Prior Publication Data

US 2003/0137906 A1 Jul. 24, 2003

(51) Int. Cl.[7] .............................................. G11B 5/596
(52) U.S. Cl. ................................................. 360/77.08
(58) Field of Search ............................ 360/77.02, 78.01, 360/77.04, 77.08, 133; 324/212

(56) References Cited

U.S. PATENT DOCUMENTS

| | | |
|---|---|---|
| 5,566,034 A | 10/1996 | Shumaker |
| 5,825,579 A | 10/1998 | Cheung et al. |
| 5,946,158 A | 8/1999 | Nazarian et al. |
| 5,982,173 A | 11/1999 | Hagen |
| 6,005,740 A | 12/1999 | Liikanen |
| 6,046,879 A | 4/2000 | Hampshire |
| 6,049,442 A | 4/2000 | Fukushima et al. |
| 6,064,542 A | 5/2000 | Shepherd |
| 6,091,567 A | 7/2000 | Cooper et al. |
| 6,101,064 A | 8/2000 | Shepherd |
| 6,175,472 B1 | 1/2001 | Valent |

*Primary Examiner*—David Hudspeth
*Assistant Examiner*—Mitchell Slavitt
(74) *Attorney, Agent, or Firm*—Gates & Cooper LLP

(57) ABSTRACT

Non-linearity in a position error signal (PES) for a data storage device is precisely characterized during a calibration phase in the manufacturing process. From this characterization of the PES non-linearity, the data storage device can be programmed with the necessary data to perform accurate, real-time linearization calculations of the PES in order to compensate for non-linearity in the PES during operation. The sequence of calibration steps includes a PES gain calibration, a first servo loop gain calibration, a PES linearization calibration, and an optional second servo loop gain calibration.

21 Claims, 8 Drawing Sheets

POSITION ERROR SIGNAL LINEARIZATION CALIBRATION

BACKGROUND OF THE INVENTION

1. Field of the Invention

The present invention relates generally to servo control systems used for positioning read/write transducers in data storage devices, and more particularly, to providing precise characterizations of non-linearities in a position error signal during manufacturing test calibration, so that the servo control system can be programmed with the necessary algorithms and parameters to perform accurate, real-time linearization calculations of the position error signal in order to compensate for the non-linearities in the position error signal.

2. Description of Related Art

It is well known in the art to store data on magnetic or optical disk drives. Data is stored on a disk drive on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly that is moved by a servo loop.

The servo loop controls movement of the head positioning assembly across the disk surface to move the read/write head from track to track (track seeking) and, once over a selected track, to maintain the read/write head in a path over the centerline of the track (track following). Centering the read/write head over a track permits accurate reading and recording of data in the track.

In most devices, the servo loop is a closed loop system that utilizes sampled position information, also known as servo information, obtained from the disk surface to provide feedback for the track seeking and track following functions. Some devices store this position information between the data regions of the disk surface (known as an embedded servo system).

The sampled position information usually includes: a synchronization field, such as for automatic gain control (AGC) or similar signal detecting purposes; a track identification (TID) field typically comprising a digitally encoded Gray code; and a position error signal (PES) field generally containing one or more burst patterns. The PES, which is proportional to the relative difference of the positions of the center of the read/write head and the nearest track center, is a corrective signal providing an indication of which direction the head should be moved to during either track seeking or track following functions.

Linearization has been used to compensate for non-linearity in the PES. Consider, for example, U.S. Pat. No. 5,825,579, issued Oct. 20, 1998, to Cheung, et al., and entitled "Disk drive servo sensing gain normalization and linearization," which patent is incorporated by reference herein. This patent describes a method for generating a continuous and linear PES from stitched components.

Generally, U.S. Pat. No. 5,825,579 covers the same field as the present invention, and provides a good introduction into the background, the problem being solved, and general approaches to solving the problem. Specifically, it describes a normalization stage in the servo loop that is used to correct discontinuities at the PES stitching points (i.e., quarter-track positions), to normalize the PES at the stitching points and track-center position, and then to obtain a smoothing function for the PES between the stitching points and track-center position. However, PES linearization in U.S. Pat. No. 5,825,579 is limited in that it is achieved only if the following assumptions are true: there is a triangular shape to the PES non-linearity and the shape is symmetrical about track-center, quarter-track and $\frac{1}{8}^{th}$ track positions.

There is a need in the art for improved methods of linearizing the PES due to the increasing significance of the problem with the increasing data storage radial density by increasing track-per-inch (TPI). A radial off-track position of the read/write head has been traditionally assumed to have a linear relationship to the PES. However, for magneto-resistive (MR) and giant magneto-resistive (GMR) heads, the head width is typically designed to be narrower than the track width, thereby causing the assumption to be inaccurate, with the result being errors in the position feedback, which contributes to track misregistration (TMR) and lower servo loop stability margins, and contributes to off-track read and off-track write events. The effects of PES non-linearity, if not properly compensated, are more significant with radial densities exceeding 50,000 TPI. With increasing TPI, the associated improvements in PES linearization methods must tackle challenges of measurement and calculation accuracy and reliability, and overcome hardware imperfections such as head magnetic asymmetries.

In the present invention, PES linearization compensates for the non-linearity in the translation of the PES to an off-track position of the head during each servo sector sampling that measures the PES. A real-time linearization calculation performed by the servo loop requires prior characterization of the non-linearity, which is performed during the calibration phase of each drive in the manufacturing process.

SUMMARY OF THE INVENTION

To minimize the limitations in the prior art described above, and to minimize other limitations that will become apparent upon reading and understanding the present specification, the present invention discloses a method for precisely characterizing non-linearity in a position error signal (PES) for a data storage device during a calibration phase in the manufacturing process. From this characterization of the PES non-linearity, the data storage device can be programmed with the necessary data to perform accurate, real-time linearization calculations of the PES in order to compensate for non-linearity in the PES during operation. The sequence of calibration steps includes a PES gain calibration, a first servo loop gain calibration, a PES linearization calibration, and an optional second servo loop gain calibration.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Disk Drive Components

Figure 1:
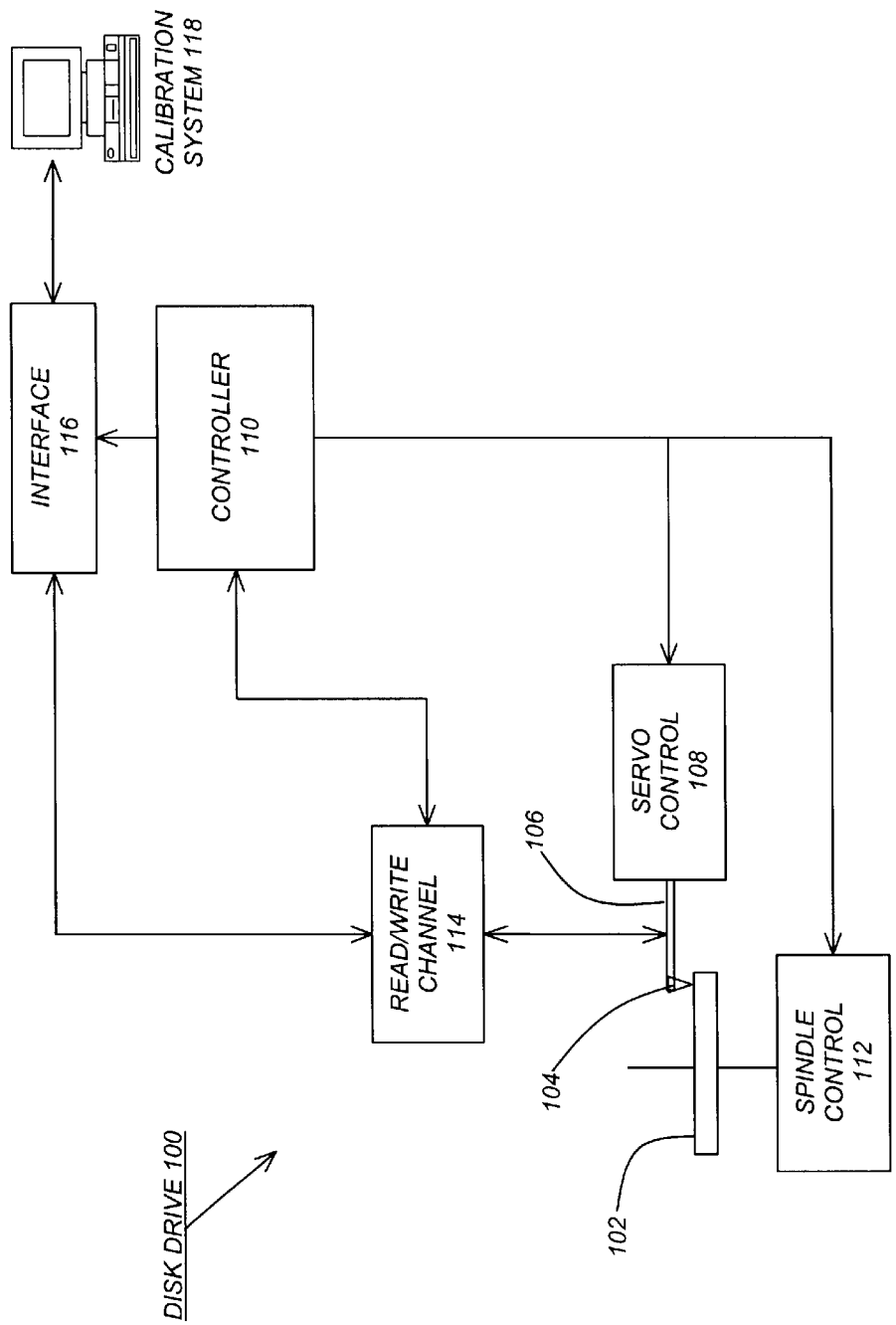
FIG. 1 is a block diagram of an exemplary disk drive according to the preferred embodiment of the present invention.

FIG. 1 is a block diagram of an exemplary data storage device 100, i.e., a disk drive 100, according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 100 is comprised of one or more disks 102, which may be stacked and rotateably mounted on a spindle, wherein information is stored on the surfaces of the disks 102 in the form of transitions or patterns formed on one or more tracks thereon. Transitions are sensed or "read" from the surfaces of the disks 102 via one or more transducers 104, known as read/write heads, supported in close proximity to the surfaces of the disks 102 by a head positioning assembly 106, wherein the transducers 104 convert the transitions into electrical signals. The head positioning assembly 106 positions the transducers 104 over the surfaces of the disks 102 in a linear or rotary manner by operation of a servo control 108, which is controlled by a controller 110, while the rotation of the disks 102 is sped up or slowed down by a spindle control 112, which is also controlled by the controller 110.

Data is provided to and from the read/write heads 104 through a read/write channel 114 and interface 116 with a host computer, e.g. calibration system 118. The read/write heads 104 write data to the surfaces of the disks 102, and then read the data from the surfaces of the disks 102, as well as provide servo information from the surfaces of the disks 102 to the controller 110.

The servo information, which comprises sampled position information, is provided to the controller 110, in the form of a position error signal (PES), to indicate the direction and extent of movement required to maintain the read/write heads 104 centered about a track on the disk 102. The controller 110 then uses the PES to generate the control signals to the servo control 108 to move the head positioning assembly 106 and read/write heads 102.

In this manner, the read/write channel 114, the controller 110, and the servo control 108 comprise a servo loop that controls movement of the head positioning assembly 106 across the surface of the disks 102 to move the read/write heads 104 from track to track (track seeking) and, once over a selected track, to maintain the read/write heads 104 in a path over the centerline of the track (track following). Centering the read/write heads 104 over a track permits accurate reading and recording of data in the track.

Operation of the Preferred Embodiment

In the preferred embodiment of the present invention, PES non-linearity is precisely characterized by the calibration system 118 during a calibration phase in the manufacturing process. From this characterization, the calibration system 118 can program the controller 110 with the necessary data (e.g., algorithms and/or parameters) to perform accurate, real-time linearization calculations of the PES in order to compensate for non-linearity in the PES during operation.

Figure 2:
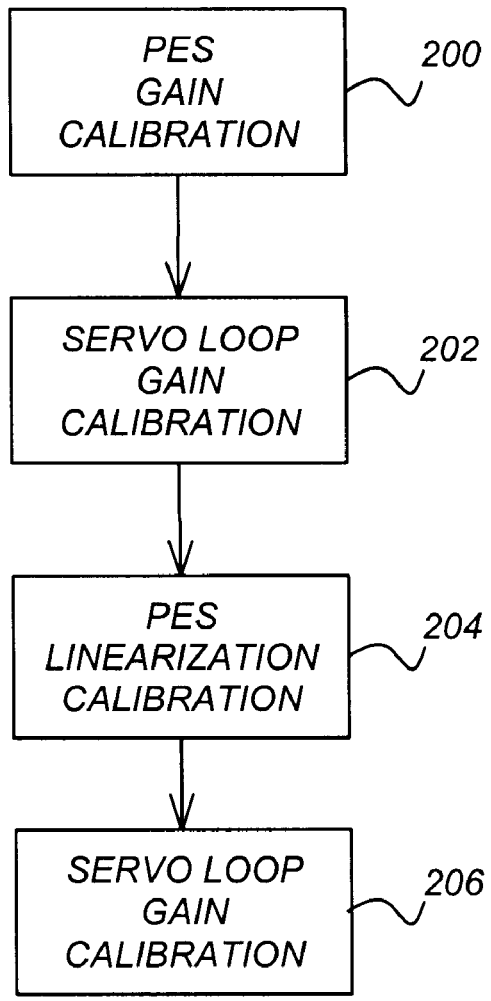
FIG. 2 is a flowchart that illustrates a sequence of calibrations performed on the disk drive according to the preferred embodiment of the present invention.

FIG. 2 is a flowchart that illustrates a sequence of calibration steps performed by the calibration system 118 on the data storage device 100 according to the preferred embodiment of the present invention. Those skilled in the art will recognize that other sequences could also be used, without departing from the scope of the present invention.

Block 200 represents a PES gain calibration being performed for stitching the PES gains at quarter-track positions for even and odd track types on the data storage device 100. The calibration result of Block 200 is then made effective for the following steps, such as by a power-on reset.

Block 202 represents a first servo loop gain calibration being performed at a first target frequency with a first target gain at the track-center position on the data storage device 100 and with a first noise excitation. The calibration result of Block 202 is then made effective for the following steps, such as by a power-on reset.

Block 204 represents a PES linearization calibration being performed to obtain a non-linear property of an off-track position vs. the PES at locations spaced from the track-center position for even and odd track types on the data storage device 100, wherein the PES linearization calibration includes open loop servo transfer function analysis (TFA) gain measurement, such as using the same servo loop gain calibration as in Block 202, but at a second target frequency with a second target gain at the track-center position and at locations spaced from the track-center position and with a second noise excitation. The calibration result of Block 204 is then made effective for the following steps, such as by a power-on reset.

Block 206 represents a second servo loop gain calibration being performed at a third target frequency and with a third target gain at the track-center position and with a third noise excitation. The calibration result of Block 206 is then made effective for any further manufacturing calibrations or testing, such as by a power-on reset.

The first, second and third target frequencies, target gains, and noise excitations in Blocks 202, 204 and 206 may be different and are in fact designed to be different for best results. This is due to the different purpose of each Block and the change of servo loop characteristics after each Block, as well as the need to maintain stable operation and measurement accuracy at each Block. The changes of servo loop characteristics are in the frequency response and in the noise content, including repeatable runout (RRO) and non-repeatable runout (NRRO), that affect further measurements, at the track-center and off-track positions.

The first target gain for Block 202 may be low for better stability margin at the track-center position after this Block due to the high PES gain, before linearization is completed at Block 206. The second target gain for Block 204 may be higher for better calculation resolution to obtain the PES non-linearity property, and these gains, unlike the first and third target gains in Blocks 202 and 204, are only used for normalizing calculation and not directly used for actual control. In certain variations of actual implementation the second target gain may not be required if the open loop servo TFA gain is measured directly. The third target gain for Block 206 is designed to meet target servo loop performance requirements after PES linearization. The third target gain is usually higher than the first target gain.

Unlike Blocks 202 and 204, the design of third target gain for Block 206 needs to take into account not only the track-center position performance, but also off-track position performance. After PES linearization, the PES gain at the track-center position is reduced as desired, but the PES gain at certain off-track positions may be slightly or significantly increased due to the limitations in the number of linearization segments and the linearization accuracy to approximate the real non-linearity throughout the off-track positions.

The first and third noise excitations may be higher in Blocks 202 and 206 to allow larger motion transfer function analysis (TFA) to have a better measurement noise rejection in gain calibration at the track-center position. The second noise excitation for Block 204 may be smaller to allow smaller motion TFA, which in turn allows the measurement of the PES non-linearity, which is most significant only around the track-center and quarter-track positions, and cannot be measured accurately with a larger motion TFA.

The second target frequency for Block 204 needs to carefully avoid any drive 100 frequency points and ranges that sustain RRO and NRRO, due to the sensitivity of the small motion TFA with a small noise excitation to noise. Therefore, depending on the mechanics, the second target frequency for Block 204 may be significantly different from the first and third target frequencies for Blocks 202 and 206, which are normally close to the nominally-designed servo open-loop crossover frequency.

Block 206 is deemed optional if the designs in Block 202 have compensated for the effect of PES gain changes after Block 204, such as using a higher target gain. However, it has the merit of maintaining consistent servo loop performance from drive to drive, despite head 104 variations, and errors that may be caused and accumulated in Block 200, 202, and 204.

For accuracy and reliability reason, data collection and calculation in Blocks 200, 202, 204 and 206 may include several radial zones on the disk 102 surface, several tracks of each zone, and several measurements for each track, wherein averaging may be performed for each track and zone. For example, to handle the variations of head 104 radial location effect on PES non-linearity, radial zoning is necessary.

Real PES vs. Burst PES

Figure 3:
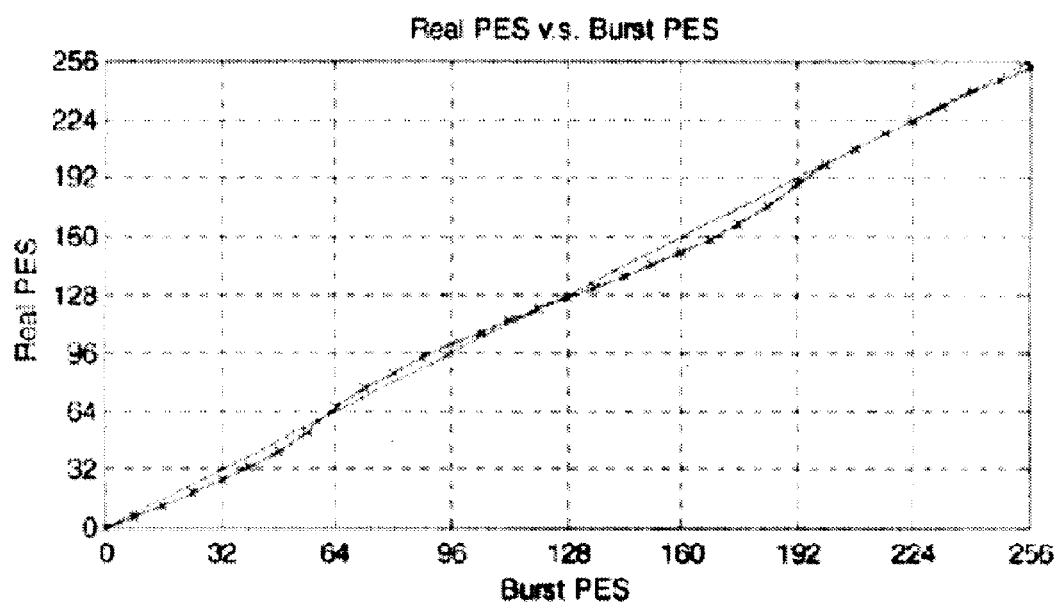
FIG. 3 is a graph that shows the non-linear real PES vs. the measurement constant distance microsteps (burst PES)

FIG. 3 is a graph that shows the non-linear real PES vs. the measurements at constant distance microsteps (burst PES). The ideal case is also shown as a straight line. The goal of PES linearization is to obtain the true PES information from the measured burst PES.

This can be accomplished by dividing a track's pitch into a plurality of segments, wherein each segment is approximated by a function. In the example of FIG. 3, with an 8-bit representation of the burst PES, the track's pitch is comprised of burst PES from 0 to 255, and the 256 microsteps have been divided into 8 segments of 32 microsteps each. Each segment is approximated by a first order linear function, which is defined by two parameters, i.e., the segment's slope and offset to an ideal line at one of two ends of the segment. The goal of PES linearization calibration is to derive the linear function for each segment, i.e., deriving the slope and offset values for the segment.

It can be observed that the slopes of each segment are not symmetrical with regard to its adjacent segments and the track-center position (at 128). Therefore, the slopes and offsets for adjacent segments need to be mathematically manipulated to obtain a continuous measurement of real PES and to avoid discontinuity at the segment boundaries as much as possible without sacrificing too much accuracy.

Figure 4:
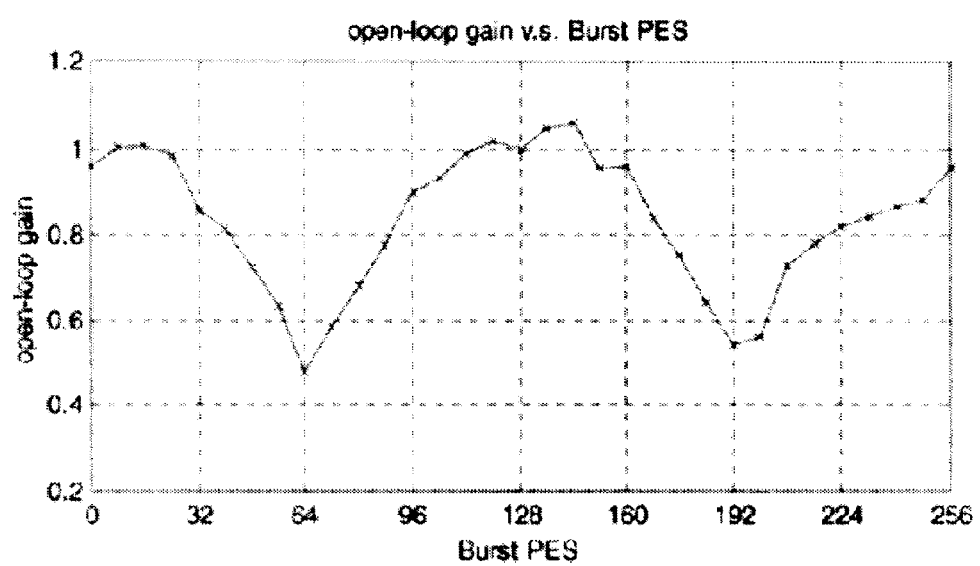
FIG. 4 is a graph that shows the measured open-loop gain vs. burst PES.

FIG. 4 is a graph that shows the measured open-loop gain vs. burst PES. Due to the narrow head, the gain around the track-center position (128) is high and the gain around the quarter-track positions (64 and 192) is low. After PES linearization, the gain vs. burst PES is more constant for improved servo loop performance around the track-center position (which is especially beneficial to write operations) and off-track positions (which is especially beneficial to read operations).

As can be observed in FIGS. 3 and 4, the slopes of the PES curve correspond to the inverse of the measured gain variation, since the latter is a result of the PES non-linearity. In general, slopes lower than 1 correspond to high gain (e.g., around 0, 128, 256), slopes higher than 1 correspond to low gain (e.g., around 64, 192), and slopes about 1 correspond to medium gain (e.g., around 32, 96, 160, 224). While the PES curve cannot be easily measured, the open-loop gain curve can be measured more easily. In the preferred embodiment, the open loop gains for each segment are measured, and the non-linear property of the PES, such as slopes and offsets, are then derived from these measurements.

At each off-track position, the slope and an inverse of the gain have a more or less constant proportional relationship, which is represented by a proportional factor. Such a relationship can be expressed in the following equation:

$$\frac{d(RPES)}{d(BPES)} = \frac{k}{\text{gain}(BPES)}$$

wherein:

k is the proportional factor, gain (BPES) is the open loop servo TFA gain at a location identified by BPES, RPES is a real PES, BPES is a burst PES.

The consistency of the proportional factor k depends on the read/write head 104 property (e.g., magnetic symmetries about its center), and servo writing and servo loop accuracy. The relationship can be characterized by testing to obtain the proportional factors. For simplicity, two factors are used, one for each side of the track's center. Alternatively, only one factor is used for all the segments. Two methods are described below to obtain such a proportional factor.

First Proportional Factor Method

Figure 5:
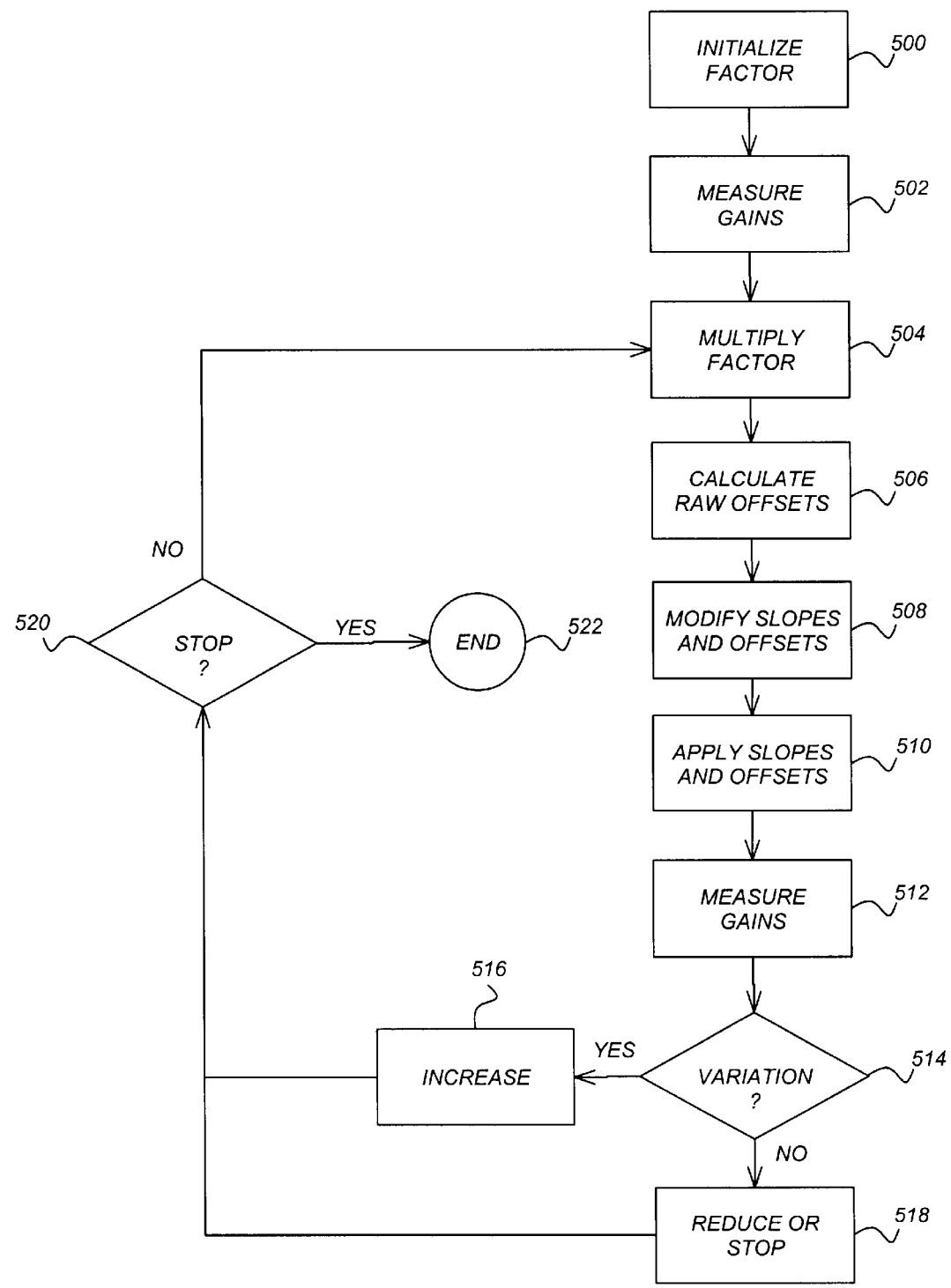
FIG. 5 is a flowchart that illustrates the logic of obtaining a proportional factor according to a first proportional factor method.

FIG. 5 is a flowchart that illustrates the logic of obtaining a proportional factor according to the first proportional factor method. Those skilled in the art will recognize that other logic could also be used, without departing from the scope of the present invention.

Block 500 represents the proportional factor being initialized to a small value.

Block 502 represents the open-loop gain being measured at a center of each segment.

Block 504 represents the proportional factor being multiplied by the inverse of the gain to obtain a raw slope of each of the segments.

Block 506 represents a raw offset of each of the segments being calculated.

Block 508 represents the raw slopes and raw offsets being modified to minimize discontinuities at the segment boundaries.

Block 510 represents the modified slopes and offsets being applied to the PES linearization.

Block 512 represents the gains being measured again at the center of each segment with the PES linearized with the calculated slopes and offsets.

Block 514 is a decision block that determines whether the new variation in the measured gains among the measured segments after the linearization with the above calculated slopes and offsets is smaller by a certain percentage than the previous variation in the measured gains among the measured segments before the linearization with the current calculated slopes and offsets. If so, control transfers to Block 516; otherwise, control transfers to Block 518.

A simple way of defining the variation is by averaging the two gains at BPES=112 (center of the segment between BPES=96 and 128) and BPES=144 (center of the segment between BPES=128 and 160), averaging the two gains at BPES=80 (center of the segment between BPES=64 and 96) and BPES=176 (center of the segment between BPES=160 and 192), and the difference between the two averages is used as an indication of the variation. The difference after PES linearization with the current slopes and offsets is compared to the previous difference before PES linearization with the current slopes and offsets. A smaller difference indicates a better proportional factor is being obtained. Other ways of defining the variation are possible in order to obtain the proportional factor.

Block 516 represents the factor being adjusted by increasing the factor (if the variation is better by a certain degree as described above), whereas Block 518 represents the factor being adjusted by reducing the factor (if the variation is worse by a certain degree as described above), or the adjustments to the factor being stopped (if the variation is not better or worse by a certain degree as described above).

Block 520 is a decision block that determines whether the adjustments to the factor have been stopped, i.e., no further increases or reductions. If so, then control transfers to Block 522 to terminate the steps of the logic when the variation is acceptable, because a final factor has been obtained; otherwise, control transfers back to Block 504 to repeat the steps of the logic with an increased or decreased factor decided earlier.

The steps represented by FIG. 5 may be implemented as part of the manufacturing calibration process, e.g., as part of Block 204 in FIG. 2. Alternatively, for reduced accuracy but with faster manufacturing calibration time, the steps can be performed as part of a servo design process using a range of sample test units and the proportional factor thus obtained offline may be used in Block 204 in FIG. 2.

Second Proportional Factor Method

Instead of the iteration method described above, a second, more direct, method can be applied using equations described below. In the following equations, k is the proportional factor, RPES is the real PES, and BPES is the burst PES:

$$\frac{d(RPES)}{d(BPES)} = \frac{k}{\text{gain}(BPES)}$$

$$RPES = k \int \frac{1}{\text{gain}(BPES)} d(BPES)$$

$$RPES(p2) = k \int_{p1}^{p2} \frac{1}{\text{gain}(BPES)} d(BPES) + RPES(p1)$$

Assuming p1 and p2 represent the quarter-track positions, which in the example below are 64 and 192, respectively, and RPES(p1) and RPES(p2) represent the values of the real PES at p1 and p2, which in the example below are 64 and 192, respectively, then:

$$\frac{1}{k} = \frac{\int_{p1}^{p2} \frac{1}{\text{gain}(BPES)} d(BPES)}{RPES(p2) - RPES(p1)} = \frac{\int_{64}^{192} \frac{1}{\text{gain}(BPES)} d(BPES)}{192 - 64}$$

The assumption above is valid if the PES is stitched at quarter-track positions (e.g., BPES=64 and BPES=192). PES gain calibration is a process to achieve such a PES stitching for quadruple PES encoding, typically identified as A, B, C and D bursts. Therefore, this method is as accurate as the method of FIG. 5, if the PES stitching is achieved and the integration is accurate. The integration can be performed by dividing the 4 segments between 64 and 192 into more segments (such as 8 in the example below) and measuring the inverse of the gain at either the boundaries or the center of each sub-segment and obtaining the summation thereof.

Figure 6:
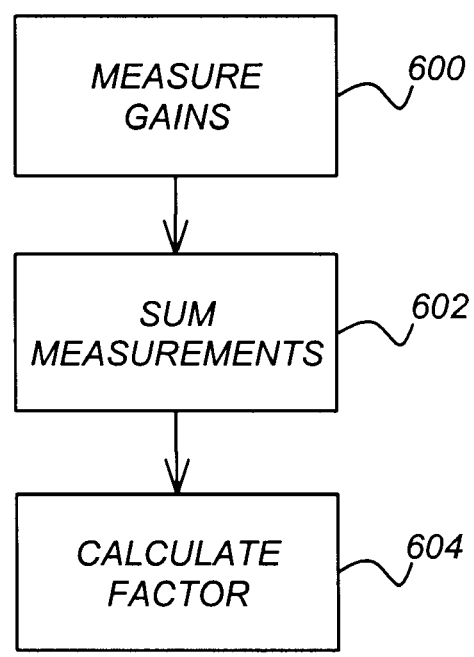
FIG. 6 is a flowchart that illustrates the logic of obtaining a proportional factor according to a second proportional factor method.

FIG. 6 is a flowchart that illustrates the logic of determining a proportional factor according to the second proportional factor method. Those skilled in the art will recognize that other logic could also be used, without departing from the scope of the present invention.

Block 600 represents the inverses of the gains being measured at multiple microsteps between quarter-track positions, i.e., at the boundaries or center of each sub-segment.

Block 602 represents the measured inverses of the gains being summed.

Block 604 represents the proportional factor k being calculated according to:

$$\frac{1}{k} = \frac{\int_{p1}^{p2} \frac{1}{\text{gain}(BPES)} d(BPES)}{RPES(p2) - RPES(p1)}$$

wherein:
  k is the proportional factor,
  gain (BPES) is the open loop servo TFA gain at the location identified as BPES,
  RPES is a real PES,
  BPES is a burst PES,
  p1 and p2 represent the quarter-track positions, and
  RPES(p1) and RPES(p2) represent the values of the real PES at p1 and p2, respectively.

PES Slopes and Offsets

Figure 7:
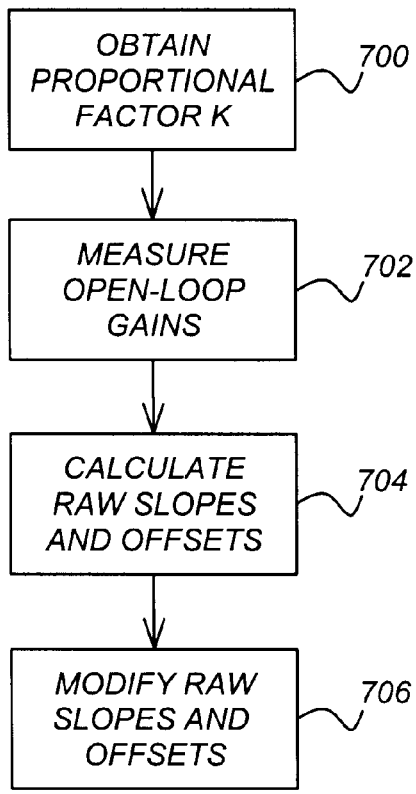
FIG. 7 is a flowchart that illustrates the logic of calculating the PES slopes and offsets from the measured open-loop gains according to the preferred embodiment of the present invention.

After one or more factors are obtained using one of the two methods discussed above, the PES slopes and offsets can be calculated from the measured open-loop gains as described above. Block 204 of FIG. 2 performs the functions illustrated in the flowchart of FIG. 7.

Block 700 represents a proportional factor k being obtained or calculated.

Block 702 represents open-loop gains being measured.

Block 704 represents raw slopes and raw offsets for each segment being calculated.

Block 706 represents the raw slopes and raw offsets being modified for better connections between each segment of the PES, while allowing some disconnections between less critical segments, if not all segments can be connected. Such a modification process and associated equations are illustrated in the example pseudo-code provided below.

PES Linearization Calibration Pseudo-Code

The pseudo-code in the following table illustrates the PES linearization calibration of Block 204 in FIG. 2 in more detail. This example is for a multiple-head (e.g., 2) drive 100 divided into a plurality of zones (e.g., 4) for each head 104. In each zone, a plurality of tracks (e.g., 4) are measured to average the even/odd track differences. At each track, a plurality of measurement (e.g., 5) are taken and averaged. Each track's pitch is divided into a plurality of segments (e.g., 8), and the segments are linearized by deriving a slope and offset from measurements of an open loop gain for the segment. The pseudo-code illustrates the second proportional factor method, and for the integration the 4 segments between 64 and 192 are divided into 8 sub-segments, i.e., each segment is divided into 2 sub-segments. The open loop gain measurement is performed at the boundaries of each sub-segments, and for the integration the inverse of the gains are summed.

Table 1

Pseudo-code

1. For head = 0 to 1
2.   For zone = 0 to 3
3.     For track = measure_start_track to measure_end_track
4.       For ustep = 64 to 192 at increments of 16
5.         For calibration cycle = 1 to 5
6.           $$\text{Obtain } g(ustep) = \frac{1}{gain(ustep)} \quad \text{(note 1)}$$
7.         Goto 5 until cycle = 5
8.         Average g(ustep) for cycle
9.       Goto 4 until ustep = 192
10.    Goto 3 until track = measure_end_track
11.    Average g(ustep) for all measure tracks in this zone
12.    norm = sum(g(ustep),ustep = 64 to 192)/9 (note 2)
13.    s3 = g(80)/norm (note 3)
       s4 = g(112)/norm (note 3)
       s5 = g(144)/norm (note 3)
       s6 = g(176)/norm (note 3)
       s3 = 0.5 + s3/2 (note 4)
       s4 = 0.5 + s4/2 (note 4)
       s5 = 0.5 + s5/2 (note 4)
       s6 = 0.5 + s6/2 (note 4)
       o4 = 128 + (96 − 128) * s4 (note 5)
       o3 = o4 + (64 − o4) * s3 (note 5)
       o6 = 128 + (160 − 128) * s5 (note 5)
       o7 = o6 + (192 − o6) * s6 (note 5)
       roffset = [0 32 o3 o4 128 o6 o7 224]         (note 6)
       rslope = [128 128 128*s3 128*s4 128*s5 128*s6 128 128] (note 6)
       rslope = decimal to hex(rslope) (note 7)
       roffset = decimal to hex(roffset) (note 7)
       o4 = 128 + (96 − 128) * s5 (note 8)
       o3 = o4 + (64 − o4) * s6 (note 8)
       o6 = 128 + (160 − 128) * s4 (note 8)
       o7 = o6 + (192 − o6) * s3 (note 8)
       foffset = [0 32 o3 o4 128 o6 o7 224]         (note 6)
       fslope = [128 128 128*s6 128*s5 128*s4 128*s3 128 128] (note 6)
       fslope = decimal to hex(fslope) (note 9)
       foffset = decimal to hex(foffset) (note 9)

Table 1-continued

Pseudo-code

14.    Goto 2 until zone = 3
15. Goto 1 until head = 1
16. Save data to a reserve area of the disk 102 that stores other typical manufacturing calibration data for later use by the controller 110.

Note 1:
gain(ustep) is the open loop gain measurement at an offset microstep (i.e., burst PES) from write center, and g(ustep) is the inverse of gain(ustep).

Note 2:
norm = i/k as described above. This step performs the integration described above using discrete summation at the boundaries of each of the 8 sub-segments, i.e., at ustep = 64, 80, 96, 112, 128, 144, 160, 176, 192. The integration accuracy may be improved by increasing the number of ustep, such as from 9 to 17 by further dividing the 8 sub-segments into 16 sub-segments.

Note 3:
These 4 lines perform the calculation of the non-linear slopes, or the differential of RPES to BPES, denoted as s3, s4, s5 and s6, at the centers of the 4 segments between the quarter tracks (the centers corresponding to BPES values of 80, 112, 144 and 176, respectively), according to:

$$s3, s4, s5 \text{ or } s6 = \frac{d(\text{RPES})}{d(\text{BPES})} = \frac{k}{gain(\text{BPES})},$$

at BPES = 80, 112, 144 or 176.

For the ideal case where there is no PBS non-linearity, s3, s4, s5 and s6 would all assume the value of 1.

Note 4:
These 4 lines perform calculations to reduce the absolute differences from each slope variables s3, s4, s5 and s6 to 1, to ensure the off-track stability after PBS linearization, since gains at some positions may be amplified to above the gain at the track-center position, while, in Block 206, the final gain calibration is done only at the track-center position to ensure servo loop performance at the track-center position, such as stability margins (including gain margin and phase margin) at the track-center position. Without this reduction, some off-track positions may not have sufficient stability margins. A general form of such an adjustment of the slope variables can be expressed as $$\frac{d(\text{RPES})}{d(\text{BPES})} = a + \frac{d(\text{RPES})}{d(\text{BPES})}(1 - a)$$

wherein:
a is an adjustment factor between 0 and 1 that scales the differential of RPES vs. BPES in order to obtain specific servo stability margins at a location spaced from the track-center position. In this example, the value of a is designed to be 0.5.

Note 5:
These 4 lines perform segment connection using the offset variables as described above, denoted as o4, o3, o6 and o7. For the ideal case where there is no PES non-linearity, o3, o4, o6 and o7 would assume the values of 64, 96, 160 and 192, respectively.

Note 6:
The offset and slope in each segment have a rise value (roffset, rslope) and fall value (foffset, fslope) to account for even and odd track type differences. Each of the roffset, rslope, foffset and fslope variables are vectors comprised of 8 values, i.e., 1 value for each segment, wherein the values are ordered by segment. The fslope variable is a vector with a reverse sequence of the vector sequence of rslope variable, and foffset variable is calculated accordingly to perform segment connection for the fslope variable. The use of rise and fall offsets and slopes to linearize the PES are known in the art. Moreover, the methods of the present invention can be applied to other PES linearization formulae that use similar concepts.

Note 7:
The decimal values of rslope and roffset are convened into hexadecimal values for the storage into memory such as a reserved area on the disk 102.

Table 1-continued

Pseudo-code

Note 8:
Following Note 6, these 4 lines calculate the foffset variable similar to the calculation of roffset. For the ideal case that there is no PBS non-linearity, o3, o4, o6 and o7 would assume the values of 64, 96, 160 and 192, respectively.
Note 9:
The decimal values of fslope and foffset are converted into hexadecimal values for the storage into memory such as a reserved area on the disk 102.

Figure 8:
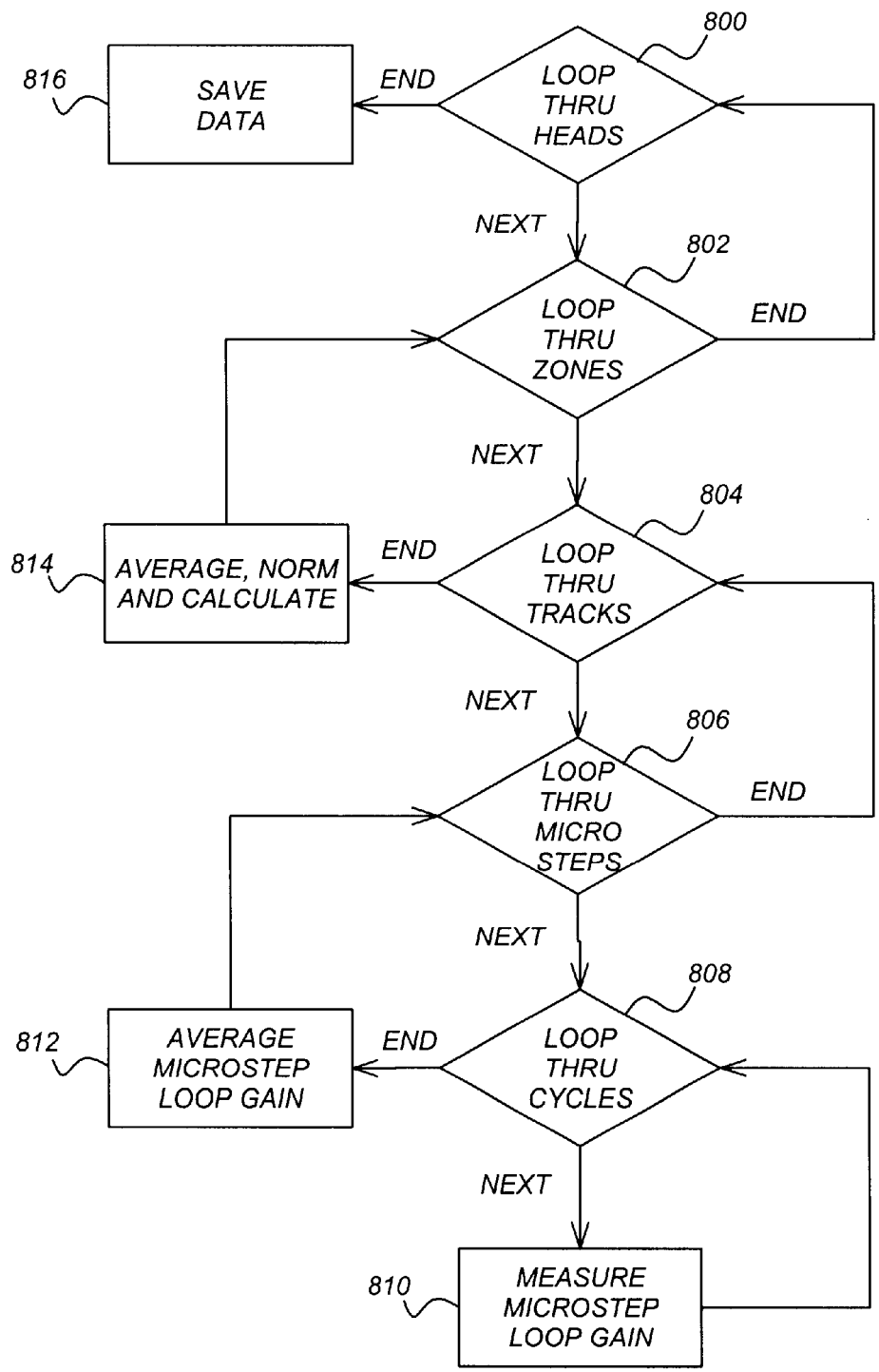
FIG. 8 is a flowchart that further illustrates the logic of calculating the PES slopes and offsets from the measured open-loop gains according to the preferred embodiment of the present invention.

PES Linearization Calibration Flowchart FIG. 8 is a flowchart that illustrates the logic of the pseudo-code in the above table. Those skilled in the art will recognize that other logic could also be used, without departing from the scope of the present invention.

Block 800 is a decision block that represents a loop being performed for head=0 to 1. For each iteration of the loop, control transfers to Block 802; upon completion of the loop, control transfers to Block 816.

Block 802 is a decision block that represents a loop being performed for zone=0 to 3. For each iteration of the loop, control transfers to Block 804; upon completion of the loop, control transfers to Block 800.

Block 804 is a decision block that represents a loop being performed for track=measure_start_track to measure_end_track. For each iteration of the loop, control transfers to Block 806; upon completion of the loop, control transfers to Block 814.

Block 806 is a decision block that represents a loop being performed for ustep (microstep)=64 to 192 at increments of 16. For each iteration of the loop, control transfers to Block 808; upon completion of the loop, control transfers to Block 804.

Block 808 is a decision block that represents a loop being performed for calibration cycle=1 to 5. For each iteration of the loop, control transfers to Block 810; upon completion of the loop, control transfers to Block 812.

Block 810 represents a microstep loop gain measurement being obtained at offset ustep from the write center of the track and at the write center of the track. Control then transfers to Block 808.

Upon completion of the loop at Block 808, control transfers to Block 812.

Block 812 represents the microstep loop gain measurements for all the cycles being averaged. Control then transfers to Block 806.

Upon completion of the loop at Block 806 (at ustep=192), control transfers to Block 804.

Upon completion of the loop at Block 804 (when track=measure_end_track), control transfers to Block 814.

Block 814 represents the microstep loop gain measurements for all measured tracks in the current zone being averaged, the averaged microstep loop gain measurement being normed, and a number of parameters being calculated, i.e., the slopes (s3, s4, s5, s6), offsets (o4, o3, o6, o7), and rise and fall values (roffset, rslope, foffset and fslope). Control then transfers to Block 802.

Upon completion of the loop at Block 802 (at zone=3), control transfers to Block 800.

Upon completion of the loop at Block 800 (at head=1), control transfers to Block 816.

Block 816 represents the data (parameters) being saved to a reserve area of the disk 102 for later real-time use by the controller 110.

CONCLUSION

This concludes the description of the preferred embodiment of the present invention. Generally, the preferred embodiment of the present invention is implemented as logic within a calibration system 118, as well as the data storage device 100. This logic comprises instructions and/or data that is embodied in or retrievable from a device, medium, carrier or signal. Moreover, these instructions and/or data, when read, executed, and/or interpreted by the calibration system 118 or the data storage device 100, cause the calibration system 118 or the data storage device 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic, instructions, and/or data embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

In conclusion, the present invention discloses a method for precisely characterizing non-linearity in a position error signal (PES) for a data storage device during a calibration phase in the manufacturing process. From this characterization of the PES non-linearity, the data storage device can be programmed with the necessary data to perform accurate, real-time linearization calculations of the PES in order to compensate for non-linearity in the PES during operation. The sequence of calibration steps includes a PES gain calibration, a first servo loop gain calibration, a PES linearization calibration, and an optional second servo loop gain calibration.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for linearizing a position error signal (PES) in a data storage device, comprising:
   (a) performing a PES gain calibration for stitching the PES gains at quarter-track positions for even and odd track types on the data storage device;
   (b) performing a first servo loop gain calibration at a first target frequency with a first target gain at a track-center position on the data storage device and with a first noise excitation; and
   (c) performing a PES linearization calibration to obtain a non-linear property of an off-track position vs. a measured PES for even and odd track types on the data storage device, wherein the PES linearization calibration includes a servo loop gain calibration at a second target frequency with a second target gain at the track-center position and at locations spaced from the track-center position on the data storage device and with a second noise excitation.

2. The method of claim 1, further comprising performing a second servo loop gain calibration at a third target frequency and with a third target gain at the track-center position on the data storage device and with a third noise excitation.

3. The method of claim 1, further comprising programming the data storage device with parameters resulting from the performing step (b) in order to perform accurate, real-time linearization calculations of the PES in order to compensate for non-linearity in the PES.

4. The method of claim 1, wherein the performing step (b) comprises dividing the track's pitch into a plurality of the segments, wherein each segment is approximated by a function.

5. The method of claim 4, wherein the function is defined by the segment's slope and offset to an ideal line at one of two ends of the segment.

6. The method of claim 5, wherein the slope and offset comprise the non-linear property.

7. The method of claim 5, wherein the slope and offset are derived by measuring an open-loop gain for each segment.

8. The method of claim 7, wherein the slope and an inverse of the gain have a proportional relationship represented by a proportional factor.

9. The method of claim 8, further comprising determining the proportional factor using the following steps:

(1) initializing the proportional factor to an initial value;

(2) measuring the gains at a center of each of the segments;

(3) multiplying the proportional factor by the inverse of the gain to obtain a raw slope of each of the segments;

(4) calculating a raw offset of each of the segments;

(5) modifying the raw slopes and raw offsets to avoid discontinuities at the segment's boundaries;

(6) applying the modified slopes and offsets to the PES linearization;

(7) measuring the gains again at the center of each segment with the PES linearized with the modified slopes and offsets;

(8) determining whether the variation in the measured gains is changed;

(9) adjusting the factor when the variation is changed and repeating steps (3)–(10) to cause the variation to reduce; and

(10) terminating the steps when there is no variation, thereby indicating that a final proportional factor has been obtained.

10. The method of claim 8, further comprising determining the proportional factor using the following steps:

(1) measuring inverses of the gains at multiple positions between quarter-track positions; and (2) calculating the proportional factor according to:

$$\frac{1}{k} = \frac{\int_{p1}^{p2} \frac{1}{gain(BPES)} d(BPES)}{RPES(p2) - RPES(p1)}$$

wherein:

k is the proportional factor, gain (BPES) is the open-loop gain at a location identified as BPES, RPES is a real PES, BPES is a burst PES, p1 and p2 represent the quarter-track positions, and RPES(p1) and RPES(p2) represent the values of the real PES at p1 and p2, respectively.

11. The method of claim 8, further comprising calculating the slopes and offsets from the measured open loop gains according to the following steps:

(1) obtaining a proportional factor k;

(2) measuring the open-loop gains;

(3) calculating the raw slopes and raw offsets for each segment; and (4) modifying the slopes and offsets for better connections between each segment of the PES, while allowing some disconnections between less critical segments, if not all segments can be connected.

12. The method of claim 11, further comprising modifying the raw slopes, between steps (3) and (4), according to:

$$\frac{d(RPES)}{d(BPES)} = a + \frac{d(RPES)}{d(BPES)}(1-a)$$

wherein:

$$\frac{d(RPES)}{d(BPES)}$$

is a differential of RPES vs. BPES,

RPES is a real PES,

BPES is a burst PES, and a is an adjustment factor between 0 and 1.

13. The method of claim 1, wherein the PES linearization calibration comprises:

(1) dividing the data storage device into a plurality of zones for each head;

(2) dividing the zones into a plurality of tracks;

(3) dividing each track's pitch into a plurality of segments; and (4) linearizing each of the segments by deriving a slope and an offset for the segment from measurements of an open loop gain for the segment.

14. A method for linearizing a position error signal (PES) in a data storage device, comprising:

(a) performing a PES linearization calibration to obtain a non-linear property of an off-track position vs. a measured PES for even and odd track types on the data storage device, wherein the PES linearization calibration includes an open loop servo transfer function analysis (TFA) gain measurement at a target frequency at a track-center position and at locations spaced from the track-center position on the data storage device, and with a noise excitation;

(b) at the track-center position and at the locations spaced from the track-center position, calculating a differential of a real PES (RPES) vs. burst PES (BPES) that represents the non-linear property at a location identified as the BPES, according to:

$$\frac{d(RPES)}{d(BPES)} = \frac{k}{\text{gain}(BPES)}$$

wherein k is a proportional factor and gain (BPES) is an open-loop gain at the location identified as the BPES; and (c) at the track-center position and at the locations spaced from the track-center position, modifying the differential of the RPES vs. the BPES according to:

$$\frac{d(RPES)}{d(BPES)} = a + \frac{d(RPES)}{d(BPES)}(1-a)$$

wherein a is an adjustment factor between 0 and 1; and (d) using the modified differential of the RPES vs. BPES to derive data to perform real-time linearization of the PES, in order to compensate for non-linearity in the PES.

15. The method of claim 14, further comprising determining the proportional factor according to:

(1) measuring inverses of the gains at the locations spaced from the track-center position; and (2) calculating the proportional factor according to:

$$\frac{1}{k} = \frac{\int_{p1}^{p2} \frac{1}{\text{gain}(BPES)} d(BPES)}{RPES(p2) - RPES(p1)}$$

wherein p1 and p2 represent the locations spaced from the track-center position.

16. A method for linearizing a position error signal (PES) in a data storage device, comprising:

(a) performing a sequence of calibration steps during a calibration phase in a manufacturing process to precisely characterize non-linearity in the PES, wherein the sequence of calibration steps includes a PES gain calibration, a first servo loop gain calibration, a PES linearization calibration, and an optional second servo loop gain calibration; and (b) programming the data storage device with data resulting from the sequence of calibration steps, so that the data storage device performs accurate, real-time linearization calculations of the PES, in order to compensate for non-linearity in the PES during operation of the data storage device.

17. The method of claim 16, wherein the PES gain calibration stitches the PES gains at locations spaced from the track-center position for even and odd track types on the data storage device.

18. The method of claim 16, wherein the first servo loop gain calibration is performed at a first target frequency with a first target gain at a track-center position on the data storage device and with a first noise excitation.

19. The method of claim 16, wherein the PES linearization calibration is performed to obtain a non-linear property of an off-track position vs. a measured PES for even and odd track types on the data storage device, and includes a servo loop gain calibration at a second target frequency with a second target gain at the track-center position and at the locations spaced from the track-center position on the data storage device and with a second noise excitation.

20. The method of claim 19, wherein the PES linearization calibration comprises:

(1) dividing the data storage device into a plurality of zones for each head;

(2) dividing the zones into a plurality of tracks;

(3) dividing each track's pitch into a plurality of segments; and (4) linearizing each of the segments by deriving a slope and an offset for the segment from measurements of an open loop gain for the segment.

21. The method of claim 16, wherein the optional second servo loop gain calibration is performed at a third target frequency and with a third target gain at the track-center position on the data storage device and with a third noise excitation.

* * * * *